(12) United States Patent
Chang et al.

(10) Patent No.: US 8,644,233 B2
(45) Date of Patent: Feb. 4, 2014

(54) METHOD OF TRANSMITTING CONTROL INFORMATION AND TERMINAL THEREOF

(75) Inventors: Sung Cheol Chang, Daejeon (KR); Kwang Jae Lim, Daejeon (KR); Sung Kyung Kim, Daejeon (KR); Seok Heon Cho, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/990,696

(22) PCT Filed: May 6, 2009

(86) PCT No.: PCT/KR2009/002374
§ 371 (c)(1),
(2), (4) Date: Nov. 2, 2010

(87) PCT Pub. No.: WO2009/136729
PCT Pub. Date: Nov. 12, 2009

(65) Prior Publication Data
US 2011/0044281 A1    Feb. 24, 2011

(30) Foreign Application Priority Data

May 6, 2008   (KR) .......... 10-2008-0041982
Apr. 28, 2009  (KR) .......... 10-2009-0037196

(51) Int. Cl.
*H04W 4/00*      (2009.01)
(52) U.S. Cl.
USPC ......... 370/329; 455/403; 455/422.1; 455/450

(58) Field of Classification Search
USPC ........ 370/310–350; 455/403, 422.1, 450–454
See application file for complete search history.

(56) References Cited

U.S. PATENT DOCUMENTS

| | | | |
|---|---|---|---|
| 2004/0014429 A1* | 1/2004 | Guo | 455/73 |
| 2004/0136344 A1* | 7/2004 | Kim et al. | 370/335 |
| 2005/0265301 A1 | 12/2005 | Heo et al. | |
| 2006/0111129 A1* | 5/2006 | Ihm et al. | 455/466 |
| 2006/0165045 A1 | 7/2006 | Kim et al. | |
| 2006/0203766 A1* | 9/2006 | Kim et al. | 370/328 |
| 2007/0041378 A1 | 2/2007 | Ihm et al. | |

(Continued)

FOREIGN PATENT DOCUMENTS

| | | |
|---|---|---|
| KR | 10-2006-0042858 A | 5/2006 |
| KR | 10-0713442 B1 | 5/2007 |
| WO | 2005/125020 A1 | 12/2005 |

OTHER PUBLICATIONS

Chang et al., UL Control Channels in IEEE 802.16m, May 5, 2008 (See IDS filed Nov. 2, 2010).*

(Continued)

*Primary Examiner* — Charles C Jiang
(74) *Attorney, Agent, or Firm* — Jefferson IP Law, LLP

(57) ABSTRACT

A terminal transmits control information to a base station by using a periodically allocated dedicated channel. In further detail, the terminal checks control information that needs to be transmitted, detects a priority of the checked control information, and selects control information to be transmitted to the base station based on the detected priority. The terminal forms a PDU by multiplexing the selected control information, and transmits the PDU to the base station.

18 Claims, 3 Drawing Sheets

(56) References Cited

U.S. PATENT DOCUMENTS

| | | |
|---|---|---|
| 2007/0217539 A1* | 9/2007 | Ihm et al. ............... 375/267 |
| 2007/0281664 A1* | 12/2007 | Kaneko et al. .......... 455/410 |
| 2008/0043650 A1* | 2/2008 | Jang et al. .............. 370/310 |
| 2009/0197624 A1* | 8/2009 | Kwak et al. ............. 455/517 |

OTHER PUBLICATIONS

Chang et al., UL Control Channels in IEEE 802.16m, IEEE 802.16 Broadband Wireless Access Working Group, May 5, 2008, pp. 5, 8, 10-15.

\* cited by examiner

METHOD OF TRANSMITTING CONTROL INFORMATION AND TERMINAL THEREOF

TECHNICAL FIELD

The present invention relates to a method for a terminal to transmit control information to a base station.

BACKGROUND ART

In a communication system, a terminal transmits control information to a base station by using a resource allocated from the base station. In this case, the control information may be transmitted to the base station by using an allocated resource in a physical (PHY) layer, or may be transmitted by using a protocol data unit (PDU) in a medium access control (MAC) layer.

However, when transmission is performed only in the physical (PHY) layer, contents that can be transmitted is limited since only control information that is predefined with the base station can be transmitted to the base station.

In addition, when the transmission is performed by using a PDU in the MAC layer, resource allocation request and its allocation are additionally required and a MAC header portion of a general PDU requires a large amount of capacity for transmission of the PDU, which is substantially irrelevant to control information.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a control information transmission method for a terminal to multiplex control information that is selected based on priority and transmit the multiplexed control information to a base station by using a dedicated channel that is periodically allocated from the base station.

Technical Solution

A control information transmission method according to an exemplary embodiment of the present invention is provided to a terminal for transmitting control information to a base station.

The method includes receiving allocation information of a dedicated channel that is periodically allocated from the base station, generating a protocol data unit (PDU) by selecting control information to be transmitted at each allocation period of the dedicated channel, and transmitting the PDU to the base station through the dedicated channel.

The generating of the PDU may include checking control information that needs to be transmitted at each period and selecting the control information to be transmitted based on the checked control information.

A terminal according to another exemplary embodiment of the present invention includes a transmitting/receiving unit, a selecting unit, and a configuring unit. The transmitting/receiving unit receives allocation information of a dedicated channel that is periodically allocated from the base station. The selecting unit checks control information that needs to be transmitted at each allocation period of the dedicated period, and selects control information to be transmitted based on a priority of the checked control information. The configuring unit generates a protocol data unit (PDU) based on the selected control information and transmits the PDU to the base station.

Advantageous Effects

According to the present exemplary embodiments, a control information transmission method is provided for a terminal to multiplex control information that is selected based on priority and transmit the multiplexed control information to a base station by using a dedicated channel that is periodically allocated from the base station.

BEST MODE FOR CARRYING OUT THE INVENTION

Figure 1:
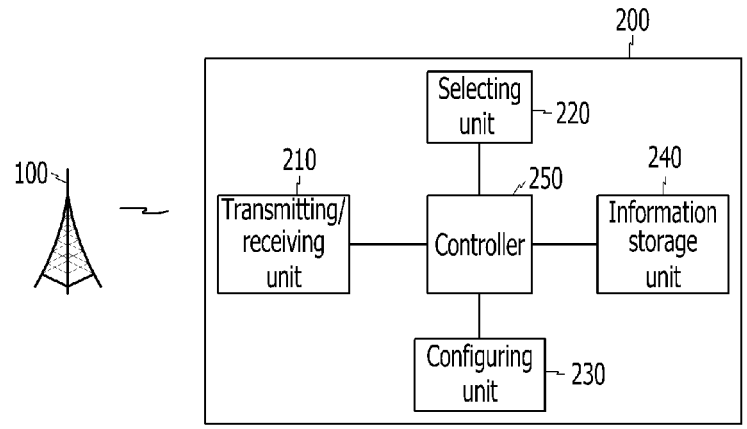
FIG. 1 schematically shows a communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the specification, a mobile station (MS) may indicate a terminal, a mobile terminal (MT), a subscriber station (SS), a portable subscriber station (PSS), a user equipment (UE), and an access terminal (AT), and may include entire or partial functions of the terminal, the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the wireless radio access station, the nodeB, the eNB, the base transceiver station, and the MMR-BS.

Hereinafter, a control information transmission method and a terminal using the same will be described in further detail with reference to the drawings.

FIG. 1 schematically shows a communication system according to an exemplary embodiment of the present invention.

Referring to FIG. 1, a communication system according to the exemplary embodiment of the present invention includes a base station 100 and a terminal 200.

The base station 100 transmits allocation information of a dedicated channel to the terminal 200, and periodically allocates a radio resource for the dedicated channel to the terminal 200 after receiving a response from the terminal 200.

In this case, the allocation information includes a channel identifier (ID) of the dedicated channel, a radio resource location of the corresponding channel, an allocation period, and a modulation and coding system (MCS) to be used.

The terminal 200 includes a transmitting/receiving unit 210, a selecting unit 220, a configuring unit 230, an information storage unit 240, and a controller 250, and transmits control information to the base station 100 by using a dedicated channel that is periodically allocated from the base station 100.

The transmitting/receiving unit 210 receives allocation information of the dedicated channel from the base station 100, and transmits a PDU for control information to the base station 100 by using the periodically allocated dedicated channel.

In this case, the PDU is transmitted by using the MCS included in the allocation information, and this can be realized by using a general method for transmitting data traffic from the terminal 200 or by applying a hybrid automatic repeat request (HARQ) protocol that corrects a transmission error.

The selecting unit 220 checks control information that needs to be transmitted to the base station 100, detects a priority of the checked control information by using the information storage unit 240, and selects control information to be transmitted to the base station 100 by using an allocated dedicated channel.

In this case, control information may be sequentially selected from control information having the highest priority in a transmission data capacity of the PDU.

The configuring unit 230 forms a PDU by multiplexing the control information selected by the selecting unit 220. The forming of the PDU will now be described in further detail.

The information storage unit 240 stores a priority of allocation information and control information of a dedicated channel.

The controller 250 controls operation of the transmitting/receiving unit 210, the selecting unit 220, and the configuring unit 230.

Figure 2:
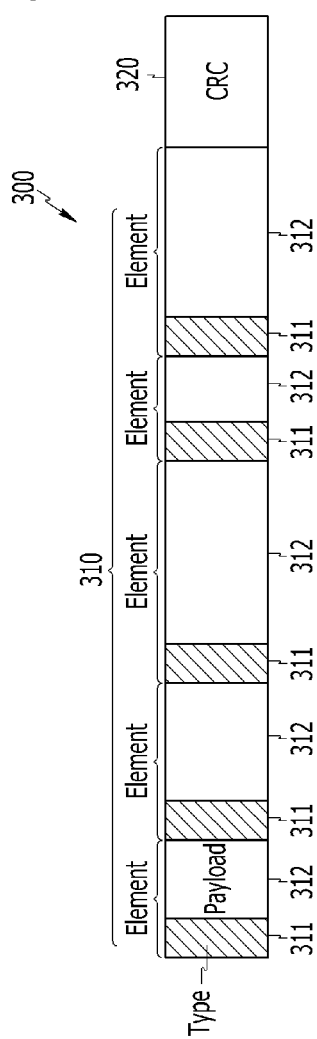
FIG. 2 and FIG. 3 respectively show a PDU structure according to the exemplary embodiment of the present invention.
Figure 3:
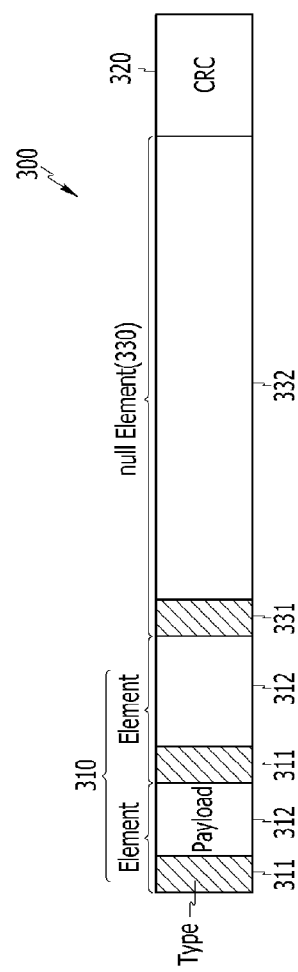

FIG. 2 and FIG. 3 respectively show a PDU structure according to an exemplary embodiment of the present invention.

Referring to FIG. 2, a PDU 300 according to the exemplary embodiment of the present invention includes a plurality of elements 310 and an error detector 320.

Each of the plurality of elements 310 includes type information 311 and a payload 312 as a unit for control information transmission. The control information that can be transmitted by using the respective elements 310 includes all the control information (e.g., MAC or PHY-related control information or report information) that can be transmitted from the terminal 200 to the base station 100.

The type information 311 represents a type of control information to be transmitted by using the corresponding element 310, and is basically realized in a fixed length, for example, 4 bits. A type of control information that is not frequently used may be realized in more than the fixed length, for example, 8 bits.

The payload 312 has a predetermined format and length according to a type defined by the type information 311, and the payload 312 stores control information that corresponds to a type represented by the type information 311.

According to the exemplary embodiment of the present invention, the terminal 200 may form the PDU 300 by selecting control information to be transmitted within the entire PDU size. The terminal 200 stores a type of the control information to be transmitted in the type information 311, and transmits the control information by using the predetermined format and length of the corresponding type.

In addition, the PDU 300 according to the exemplary embodiment of the present invention may include a null (or, padding) element 330 as shown in FIG. 3 for compensating the case that there is no PDU to be transmitted. The null element 330 is provided for setting the size of the PDU, and is located in a free resource of the PDU in the case that a PDU resource to be transmitted is greater than control information. The null element 330 may include type information 331 and a payload 332, and the payload 332 has a variable length. If the type information 331 stores a type that defining null, the payload 332 of the null element 330 has a length to the end of the PDU, excluding the error detector 320. The payload 332 of the null element 330 does not store any information. That is, the payload 332 may be zero padding.

The error detector 320 is located at the end of the PDU 300, and is provided for detecting an error and determining a location of the PDU. A cyclic redundancy check (CRC) may be used as the error detector 320.

The control information that the terminal transmits through the dedicated channel is feedback information from the terminal to the base station, and may, for example, include an aggregated bandwidth request, an average downlink carrier to interference ratio (DL CINR), a preferred downlink transmit format (DL TF), uplink (UL) transmit power, a band CINR, a differential band CINR, a post-received CINR, a precoding I, a precoding II, band request and UL transmit power, a band request and average DL CINR, a BSN report, an incremental bandwidth request, a rate change request, a CINR standard deviation, a multi input multi output (MIMO) type, an anchor change request, a channel quality indicator channel (CQICH) allocation request, a neighboring base station (NBR) CINR and received signal strength indication (RSSI), a UGS grant management, an ERTPS grant management, a BR and sleep control, a PHY channel report, a CINR statistics, a DL BSN request, a DL Sleep control, a BR and NACK request, a group allocation request, and a group allocation response.

Hereinafter, a control information transmission method according to the exemplary embodiment of the present invention will be described in further detail with reference to the drawings.

Figure 4:
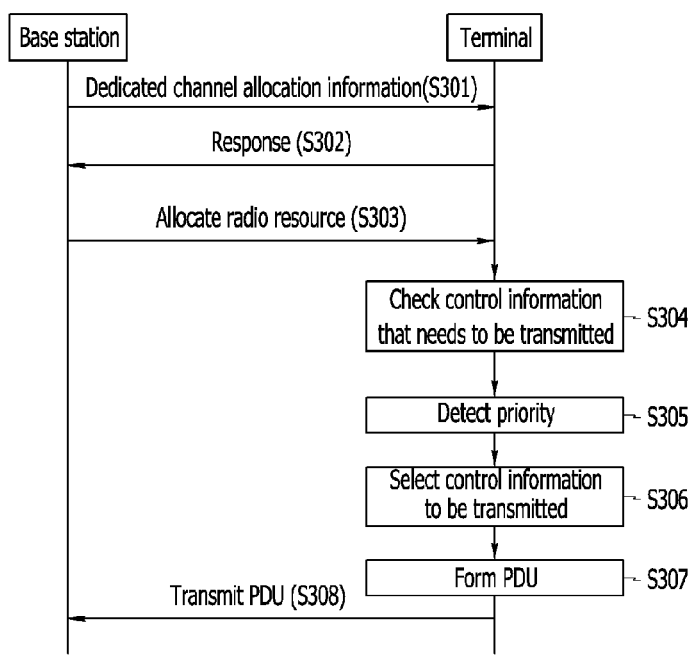
FIG. 4 is a flowchart of a control information transmission method according to the exemplary embodiment of the present invention.

FIG. 4 is a flowchart for describing a control information transmission method according to the exemplary embodiment of the present invention. Referring to FIG. 4, the base station 100 transmits allocation information of a dedicated channel to the terminal 200 (S301). After receiving a response from the terminal 200 (S302), the base station 100 periodically allocates a radio resource for the dedicated channel to the terminal 200 (S303).

The terminal 200 transmits control information to the base station 200 by using the periodically allocated radio resource for the dedicated channel. In further detail, the terminal 200 checks control information that needs to be transmitted to the base station 100 (S304), detects a priority of the checked control information (S305), and selects control information to be transmitted to the base station 100 based on the detected priority (S306).

The terminal 200 forms a PDU by multiplexing the selected control information (S307), and transmits the PDU to the base station 100 (S308).

The base station 100 and the terminal 200 repeat the steps S303 to S308 at each period.

If a characteristic of the allocated dedicated channel is changed, the base station 100 transmits changed information of the dedicated channel to the terminal 200. After receiving a response from the terminal 200, the base station 100 periodically allocates a changed resource to the terminal 200.

In addition, if the allocated dedicated channel is canceled, the base station 100 transmits dedicated channel cancellation information to the terminal 200, and excludes the corresponding dedicated channel from resource allocation of the dedicated channel when receiving a response from the terminal 200.

Figure 5:
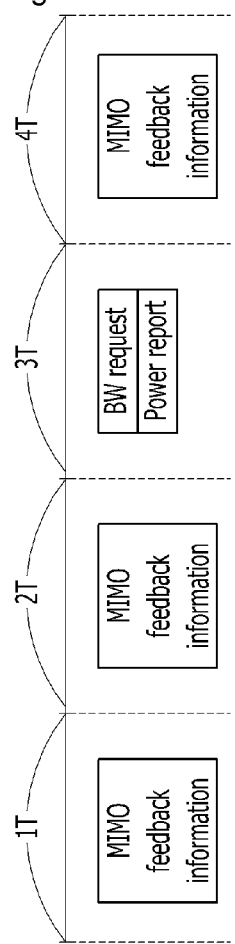
FIG. 5 shows the example of priority-based control information transmission according to the exemplary embodiment of the present invention.

FIG. 5 shows an example of priority-based control information transmission according to the exemplary embodiment of the present invention. Referring to FIG. 5, a terminal using a multi input multi output (MIMO) transmits MIMO feedback information at the first and second periods 1T and 2T. At the third period 3T, a bandwidth (BW) request and power report having a higher priority than the MIMO feedback information are multiplexed and transmitted. At the fourth period 4T, the MIMO feedback information is selected again for transmission.

According to the exemplary embodiments of the present invention, the terminal can transmit various control information to the base station by using a fixedly allocated resource, and can select control information to be transmitted. In addition, the PDU according to the exemplary embodiment of the present invention does not include a MAC header portion of the general PDU so that a portion used for substantial transmission of control information is greater than that of the general PDU.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a terminal to transmit control information to a base station, comprising:
    receiving allocation information of a dedicated channel that is periodically allocated from the base station;
    detecting priorities of a plurality of control information;
    generating a protocol data unit (PDU) by selecting control information to be transmitted at each of allocation periods of the dedicated channel based on the priorities of the control information; and
    transmitting the PDU generated in a corresponding allocation period among the allocation periods to the base station through the dedicated channel at each of the allocation periods.

2. The method of claim 1, wherein the generating of the PDU comprises:
    checking control information that needs to be transmitted at each of the allocation periods; and
    selecting the control information to be transmitted based on the checked control information.

3. The method of claim 2, wherein the selecting of the control information to be transmitted is sequentially performed from control information having the highest priority in transmission data capacity.

4. The method of claim 1, wherein the generating of the PDU comprises:
    allocating the control information to be transmitted to at least one element; and
    generating the PDU including the element and an error detector.

5. The method of claim 4, wherein the generating of the PDU further comprises further allocating type information that indicates a type of the control information allocated to the element.

6. The method of claim 5, wherein the element includes a payload of which a length is determined by the type information, and the control information is allocated to the payload.

7. The method of claim 4, wherein the error detector is a cyclic redundancy check (CRC).

8. The method of claim 4, wherein the PDU does not include a header.

9. The method of claim 4, wherein the control information is control information related to a medium access control (MAC) or physical (PHY) layer.

10. The method of claim 4, wherein the PDU further comprises type information defining null that indicates the case that there is no data to be transmitted and a null element including a payload that corresponds to the null.

11. The method of claim 10, wherein the payload corresponding to the null has a length to the end of the PDU, excluding the error detector.

12. The method of claim 1, wherein the allocation information includes an identifier for the dedicated channel, a radio resource location corresponding to the dedicated channel, an allocation period, and a modulation and coding scheme (MCS) which are included in the dedicated channel.

13. A terminal that transmits control information to a base station, comprising:
    a transmitting/receiving unit that receives allocation information of a dedicated channel that is periodically allocated from the base station;
    a controller configured to check priorities of a plurality of control information that need to be transmitted at each allocation period of the dedicated period, select control information to be transmitted based on the priorities of the checked control information at each of the allocation periods of the dedicated channel,
    generate a protocol data unit (PDU) based on the control information selected in a corresponding allocation period among the allocation periods, at each of the allocation periods, and transmit the PDU generated in the corresponding allocation period to the base station via the transmitting/receiving unit at each of the allocation periods.

14. The terminal of claim 13, further comprising an information storage unit that stores the allocation information and the priority of the control information.

15. The terminal of claim 14, wherein the control information to be transmitted is sequentially selected from control information having the highest priority in a transmission data capacity.

16. The terminal of claim 15, wherein the PDU includes an element to which the control information to be transmitted is allocated and an error detector, the element includes type information that indicates a type of control information allocated to the element and a payload having a length that is determined by the type information, and the control information to be transmitted is allocated to the payload.

17. The terminal of claim 16, wherein the PDU further includes type information defining a null that indicates the case that there is no data to be transmitted and a null element including a payload corresponding to the null.

18. The terminal of claim 17, wherein the payload corresponding to null has a length to the end of the PDU, excluding the error detector.

* * * * *